US008483509B2

(12) United States Patent
Matsuzaka

(10) Patent No.: US 8,483,509 B2
(45) Date of Patent: Jul. 9, 2013

(54) IMAGE PROCESSING METHOD AND APPARATUS, COMPUTER PROGRAM, AND COMPUTER-READABLE STORAGE MEDIUM

(75) Inventor: Chiaki Matsuzaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/324,258

(22) Filed: Dec. 13, 2011

(65) Prior Publication Data

US 2012/0086835 A1    Apr. 12, 2012

Related U.S. Application Data

(63) Continuation of application No. 12/120,371, filed on May 14, 2008, now Pat. No. 8,094,966, which is a continuation of application No. 11/048,756, filed on Feb. 3, 2005, now Pat. No. 7,424,171.

(30) Foreign Application Priority Data

Feb. 6, 2004   (JP) .................................. 2004-031401
Jan. 5, 2005   (JP) .................................. 2005-000910

(51) Int. Cl.
   *G06K 9/40*   (2006.01)
(52) U.S. Cl.
   USPC ........................................................ 382/275
(58) Field of Classification Search
   USPC .................... 345/622, 625, 626, 643; 348/63,
       348/208.6, 240.99, 240.1, 240.2, 240.3, 561,
       348/562, E3.02, E5.055; 359/354, 432, 676,
                                   359/701; 382/275
   See application file for complete search history.

(56) References Cited

U.S. PATENT DOCUMENTS

| 5,231,281 | A | 7/1993 | DuBruco |
| 5,533,401 | A | 7/1996 | Gilmore |
| 5,719,624 | A | 2/1998 | Sasaki et al. |
| 6,313,923 | B1 | 11/2001 | Takanashi et al. |
| 6,332,002 | B1 | 12/2001 | Lim et al. |
| 6,381,343 | B1 * | 4/2002 | Davis et al. .................. 382/112 |
| 6,515,698 | B1 | 2/2003 | Sasaki et al. |
| 6,542,192 | B2 | 4/2003 | Akiyama et al. |
| 6,567,119 | B1 | 5/2003 | Parulski et al. |

(Continued)

FOREIGN PATENT DOCUMENTS

| JP | 3-049483 A | 3/1991 |
| JP | 10-233995 A | 9/1998 |

(Continued)

OTHER PUBLICATIONS

Oct. 1, 2010 Japanese Official Action in Japanese Patent Appln. No. 2005-000910.

*Primary Examiner* — Gregory F Cunningham
(74) *Attorney, Agent, or Firm* — Fitzpatrick, Cella, Harper & Scinto

(57) ABSTRACT

This invention can perform a developing process or editing process, with a high response, for raw image obtained by image sensing by a digital camera or the like. When, therefore, raw image data is input, an extraction area in the raw image data is determined on the basis of the size of an image display area in which a processed image is displayed and a magnification set at this time. A developing process is then performed for partial raw image data in the determined area, and the resultant data is displayed in the image display area.

23 Claims, 13 Drawing Sheets

U.S. PATENT DOCUMENTS

| | | |
|---|---|---|
| 6,614,873 B1 | 9/2003 | Taylor et al. |
| 6,643,416 B1 | 11/2003 | Daniels et al. |
| 6,744,929 B1 | 6/2004 | Okada |
| 2001/0002142 A1 | 5/2001 | Akiyama et al. |
| 2002/0158815 A1 | 10/2002 | Zwern |
| 2003/0030729 A1 | 2/2003 | Prentice et al. |
| 2003/0179297 A1 | 9/2003 | Parulski et al. |
| 2004/0036663 A1 | 2/2004 | Bevers et al. |
| 2004/0066973 A1 | 4/2004 | Prakash et al. |
| 2004/0213449 A1 | 10/2004 | Safaee-Rad et al. |
| 2006/0152609 A1 | 7/2006 | Prentice et al. |

FOREIGN PATENT DOCUMENTS

| | | |
|---|---|---|
| JP | 11-191841 A | 7/1999 |
| JP | 2002-077621 A | 3/2002 |
| JP | 2004-040559 A | 2/2004 |

* cited by examiner

FIG. 4A

FIG. 4B  | R | G |
         | G | B |   1 BLOCK

FIG. 4C  | B | G | B |
         | G | R | G |
         | B | G | B |

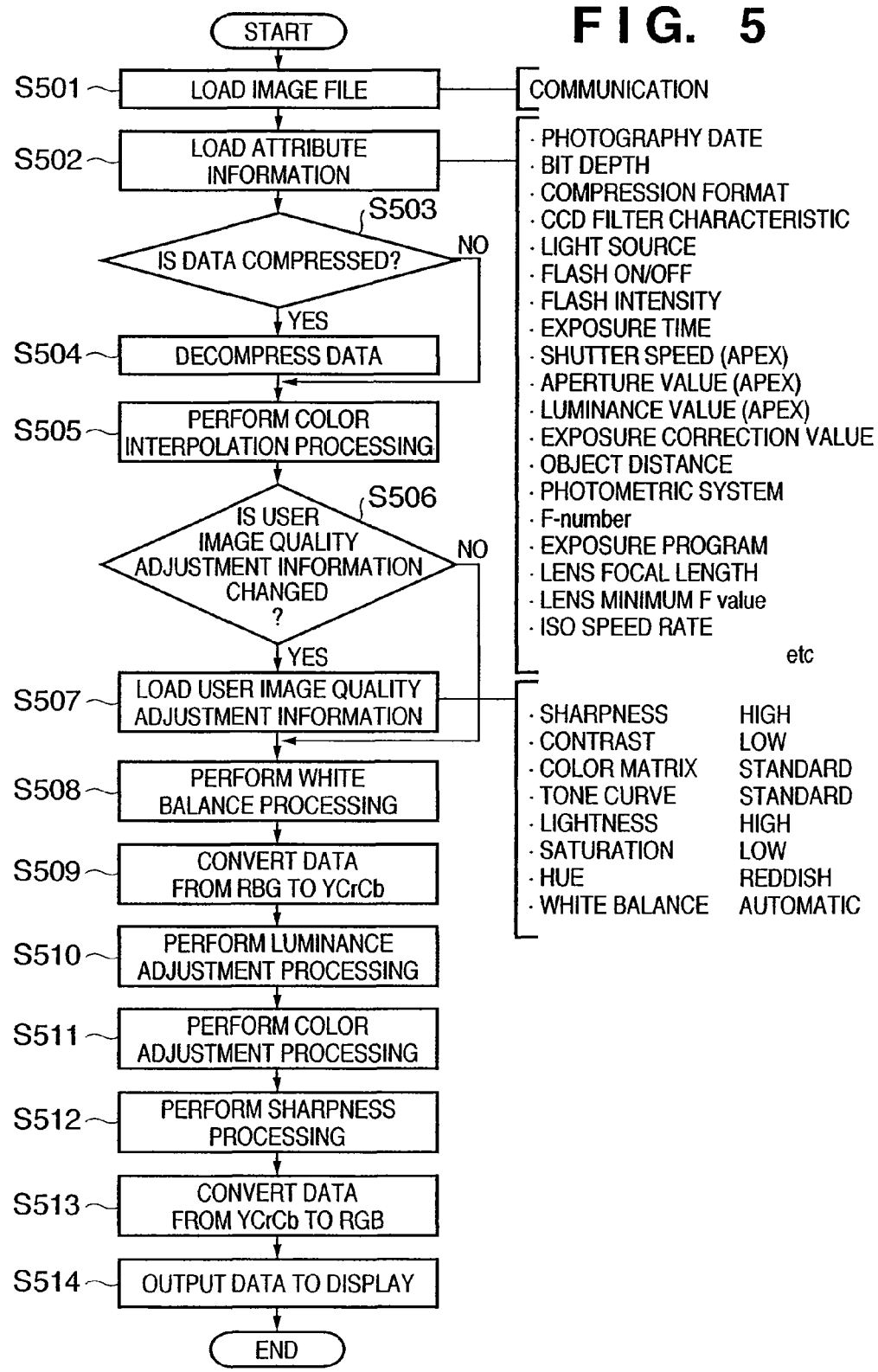

IMAGE PROCESSING METHOD AND APPARATUS, COMPUTER PROGRAM, AND COMPUTER-READABLE STORAGE MEDIUM

This application is a continuation of application Ser. No. 12/120,371 filed May 14, 2008, which is a continuation of application Ser. No. 11/048,756 filed Feb. 3, 2005, U.S. Pat. No. 7,424,171 B2.

FIELD OF THE INVENTION

The present invention relates to image processing for raw image data obtained by image sensing by a digital camera, digital video camera, or the like.

BACKGROUND OF THE INVENTION

When image sensing is performed by a digital still camera, a digital video camera, or the like, the image data input from an imaging sensor such as a CCD or a CMOS sensor, is influenced by a developing process (luminance adjustment, color tone adjustment, sharpness processing, and the like). The resultant data is then JPEG-Baseline coded and stored as a file in a predetermined storage medium (memory card) (for example, Japanese Patent Laid-Open No. 3-49483).

This coding, however, is lossy coding, and hence accompanies the losses of some information. That is, there is a limit to the readjustment of a JPEG image file on a personal computer; this coding does not allow fine adjustment often requested by experimented users.

In order to meet such demands, there may be provided a technique of storing unprocessed image data in a storage medium, immediately after it is obtained by an imaging sensor, without any change or upon lossless compression, and performing, on a PC, a process similar to a developing process performed in a digital camera. Such unprocessed image data is generally called raw image data. Performing a developing process for this raw image data on the PC makes it possible to perform elaborate developing so as to meet the demand of the power users.

When, however, a developing process for raw image data is to be done on the PC, it is necessary to perform pixel interpolation processing and white balance processing in accordance with light source information at the time of imaging, and luminance adjustment processing, color tone adjustment processing, and sharpness processing in accordance with conditions set by an operator, e.g., an exposure time, shutter speed, and zoom position, and the like.

The above developing process must be done for each pixel. In recent digital cameras, the number of pixels of sensed images is generally several millions or exceed ten million, and hence it requires much time to obtain the result of a developing process after it is started.

As conceivable techniques for solving the above problem, the present inventor has considered the following techniques.

The first technique is to perform image processing upon decimating pixels and display a reduced image or reproduce a low-resolution image processing result.

The second technique is to limit the display area, perform image processing for only part of the image data which can be displayed within the display area, and reproduce the image processing result.

The third technique is to hold the image processing result, on an overall image, in a storage medium such as a memory and use it for reproduction.

The fourth technique is to hold a plurality of image quality adjustment processing results of an overall image in a storage medium such as a memory and use them for the reproduction and the display of processing results after image quality adjustments.

According to the first technique, an increase in the number of decimated pixels will shorten the processing time until reproduction. However, as the number of decimated pixels increases, images with lower resolutions are displayed. Such images are therefore not suitable for either sharpness processing evaluation, or noise reduction processing, and the like.

According to the second technique, since an image is partly processed, the overall image cannot be checked. This technique is therefore not suitable for evaluating the overall color tone after white balance processing or color adjustments. In addition, limiting a display area will eliminate the degree of freedom of the user's operation.

The third technique requires a lot of time for the first reproduction and/or processing. In addition, when image quality adjustment is performed, the image processing needs to be executed again. Each such operation is time-consuming.

The fourth technique requires much time for the first reproduction and/or processing. This technique may be effective when the number of types of parameters that can be used for image quality adjustment is small. However, since there is a tendency towards diversification of image quality adjustments, even processing results which the user does not require may be held, resulting in an increase in computational load.

Furthermore, with improvements in image quality, image processing tends to become more complex. In addition, the number of pixels constituting an image tends to increase. It is therefore necessary to speed up reproduction and image processing.

SUMMARY OF THE INVENTION

The present invention has been made in consideration of the above problems, and has as its object to provide a technique which allows the execution of processing with a high response during a developing or editing process of raw image data sensed by a digital camera or the like.

In order to achieve the above object, an image processing apparatus according to the present invention has, for example, the following arrangement.

There is provided an image processing apparatus which develops and edits raw image data obtained by an image sensing device having an imaging sensor, comprising:

input means for inputting raw image data;

parameter setting means for setting an image processing parameter;

area size setting means for setting a size of an output area for reproduction/outputting of an image;

magnification setting means for setting a magnification of an image output to the output area;

extraction area size determining means for determining a size of an extraction area in the raw image data on the basis of the size of the output area set by the area size setting means and the magnification set by the magnification setting means;

image processing means for performing image processing for partial raw image data in the extraction area determined by the extraction area size determining means, on the basis of the parameter set by the parameter setting means; and output means for outputting the image data obtained by the image processing means to the output area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C are views for explaining the pixel array of an image signal;

FIG. 5 is a flowchart showing the steps up to loading a raw image from a recording device and displaying it on an output device;

DETAILED DESCRIPTION OF THE PREFERRED EMBODIMENTS

The embodiments of the present invention will be described in detail below with reference to the accompanying drawings.

<First Embodiment>

Figure 1:
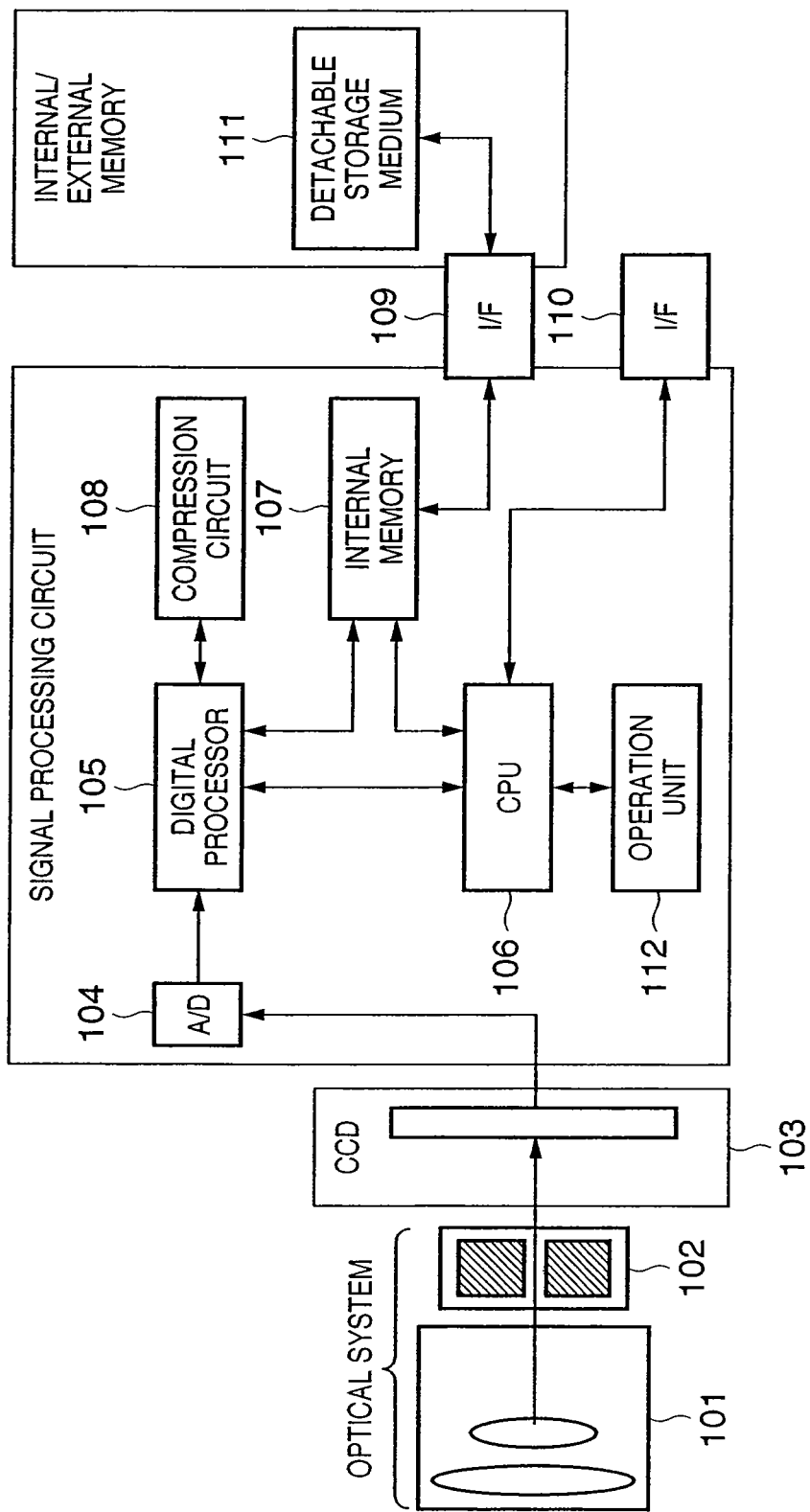
FIG. 1 is a block diagram showing the arrangement of a digital still camera as an image input device.

FIG. 1 is a block diagram showing the arrangement of a digital still camera serving as an image input device according to this embodiment. Referring to FIG. 1, reference numeral 101 denotes a photographing lens; 102, a shutter/stop; 103, a photoelectric conversion device (to be referred to as a CCD hereinafter) which converts an optical image of an object (to be photographed) imaged by a photographing optical system into an electric signal; 104, an analog/digital converter (to be referred to as an A/D converter) which converts an output from the CCD 103 into a digital signal; 105, a digital processor which processes the signal digitized by the A/D converter 104; 106, a CPU which performs camera control and signal processing; 107, a rewritable memory which is used for temporary storage in processing by the CPU; 108, a signal processing circuit which performs compression processing for recording; 109, an interface for connection to a detachable recording medium; 110, an interface (e.g., a USB interface) for connection to a personal computer or the like; 111, a detachable recording medium (memory card); and 112, an operation unit which is comprised of buttons such as a shutter button and photographing/recording mode switch and a liquid crystal display device.

Figure 2:
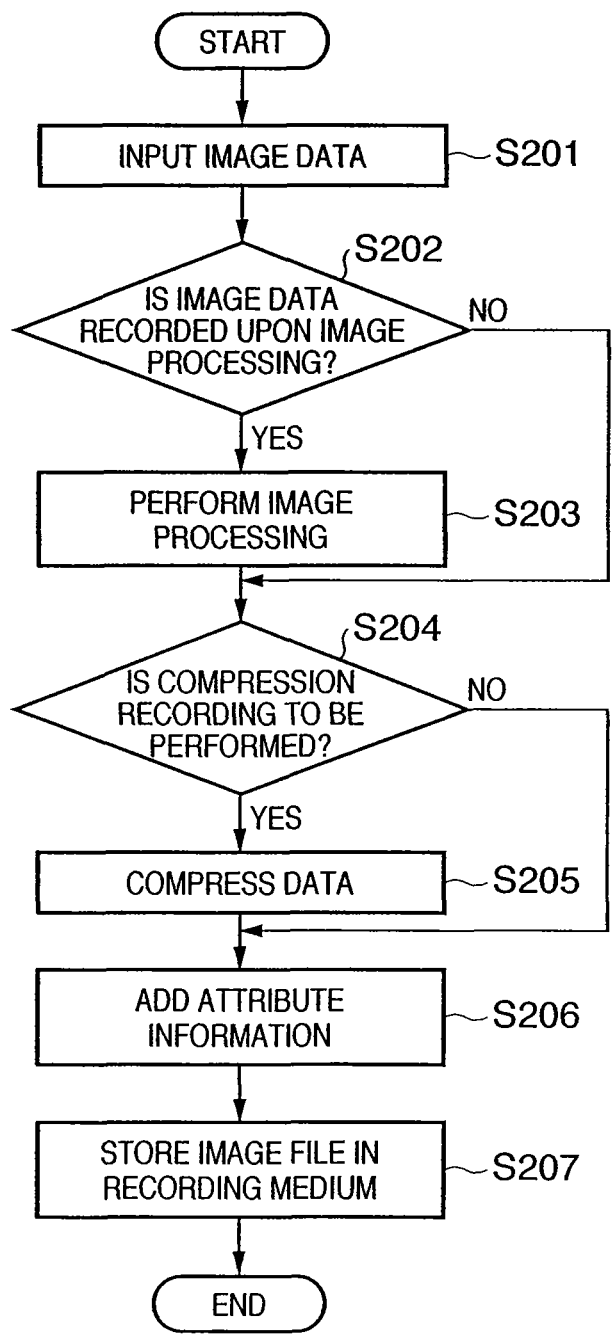
FIG. 2 is a flowchart showing the steps up to recording an image obtained by the image input device.

FIG. 2 is a flowchart showing the step of storing the image data from the digital still camera into the recording medium 111. This processing is also performed when the shutter button of the operation unit 112 is pressed.

In step S201, the digital image data obtained by converting an analog signal from the CCD 103 into digital data by using the A/D converter 104 is stored in the internal memory 107. The A/D converter 104 converts each component forming one pixel into digital data consisting of the number of bits larger than 8 bits (e.g., 12 bits) in order to improve the precision of internal image processing (to be described later) and meet demands from a skilled user in current processing (to be described later).

In step S202, it is determined whether or not image processing is to be performed. This determination is performed in accordance with a recording mode set by the photographer with the operation unit 112 at the time of photography. The recording modes include a raw image recording mode and a normal recording mode. The latter mode comes with the size of an image to be recorded, image quality, sharpness and brightness correction, and the like. In either mode, compression/non-compression can be set. If the execution of compression in the raw image recording mode is set, lossless compression (e.g., Huffman coding in TIFF or the like) is performed. If the execution of compression in the normal recording mode is set, JPEG Baseline coding (lossy compression) is performed.

If it is determined in step S202 that the normal recording mode is designated, the flow advances to step S203 to perform image processing in accordance with the conditions set with the operation unit 112. In this embodiment, filter processing, color adjustment based on information such as white balance information and autofocus information, and the like are performed. In this stage, each component forming a pixel is rounded to 8 bits.

In step S204, it is determined whether or not compression recording is to be performed. This determination is performed on the basis of information indicating necessity/unnecessity of compression which is set with the operation unit 112.

If it is determined that compression is performed, the flow advances to step S205. In the raw image recording mode, the raw image data stored in the internal memory 107 is losslessly compressed. That is, each component obtained by the A/D converter 104 is losslessly compressed with no reduction in the number of bits from 12 bits. In the normal recording mode, JPEG Baseline coding (lossy) is performed. In JPEG Baseline coding, a component of each pixel is expressed by 8 bits.

The flow then advances to step S206 to generate attribute information from photographing conditions and recording conditions such as a photography date, an apparatus model for photography, flash on/off, and a recording format for a sensed image file, and add the information to the image data. In step S207, the resultant data is written as a file in the recording medium 111.

Note that a compressed file and uncompressed file can exist in the recording medium 111, and an image data file obtained by A/D-converting a signal output from the CCD 103 and can be converted back into an image (each component consisting of 12 bits) without image processing associated with color after white balance processing will be referred to as raw image data.

Note that the following may be referred to as raw image data: image data which is obtained by A/D-converting an image signal obtained from the imaging sensor and has not yet undergone color separation processing of separating the signal into a luminance signal and chrominance signals or image data which is obtained from an output signal from a single-CCD sensor having color filters of a plurality of colors and has not undergone color interpolation processing. Alternatively, image data which is obtained from an image sensor having multicolor photosensitive layers and has not yet undergone color plane data generation processing may be referred to as raw image data.

Figure 3:
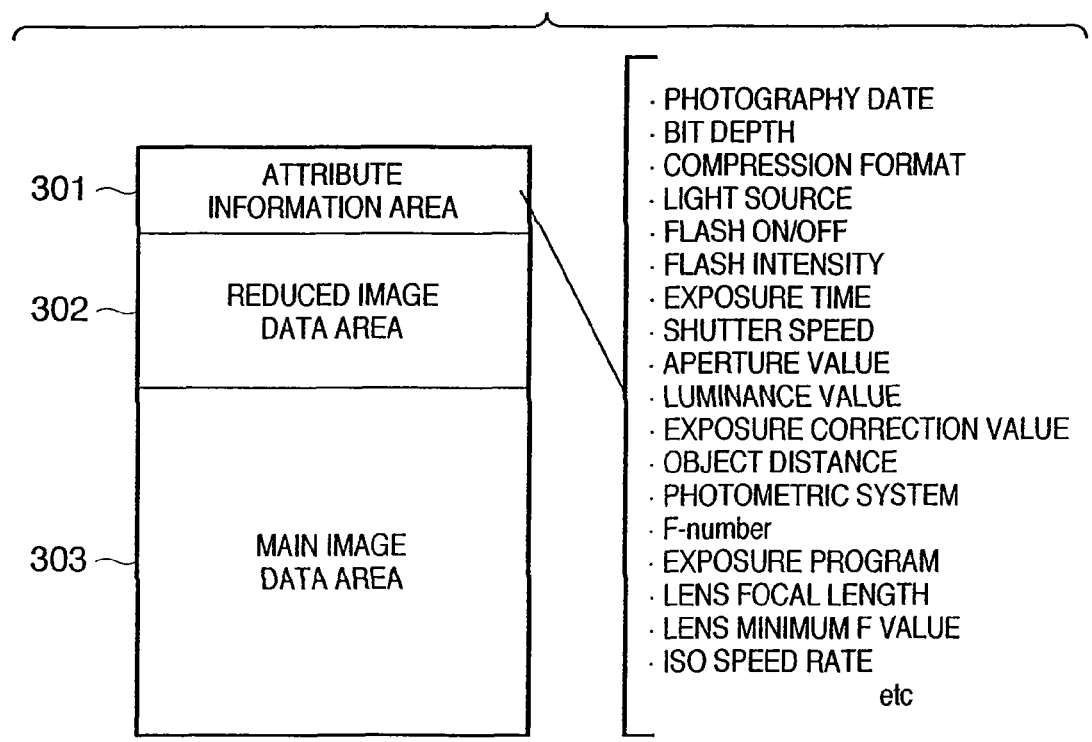
FIG. 3 is a view showing the structure of an image file.

FIG. 3 shows the structure of an image file stored in the recording medium 111.

Referring to FIG. 3, reference numeral 301 denotes an image attribute information area, which is used to store information at the time of photography, e.g., an image data size, photography date, apparatus model for photography, compression method, and flash on/off and information necessary for reading, reproduction, and selection of an image; 302, a reduced image data area, which is used to store reduced image data used for the display of a list of image files; and 303, an image data area, which is used to store all image data to be stored as an image file.

Figures 4A, 4B, 4C:
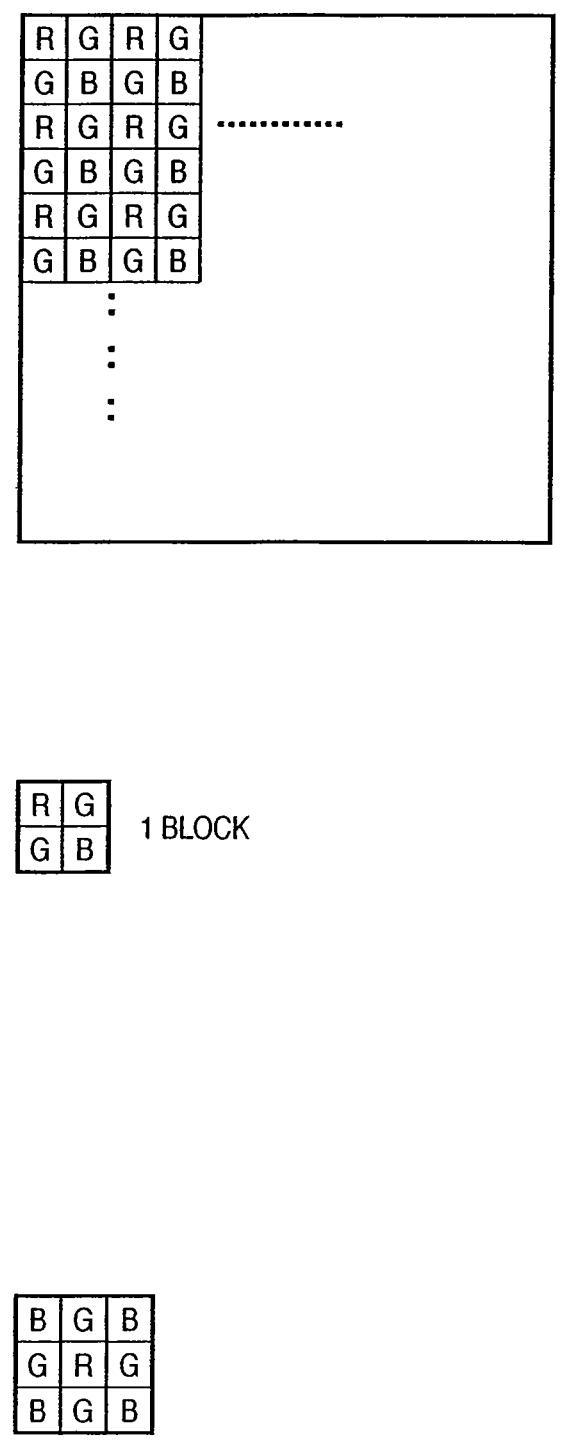

FIGS. 4A to 4C show the array of the photoelectric conversion elements of the CCD 103 according to this embodiment. This array is generally called a Beyer array. The data digitized by the A/D converter 104 and stored is divided into blocks like those shown in FIG. 4A when the CCD includes primary color filters and a monochrome photosensitive layer. As shown in FIG. 4B, one block is comprised of four components including color signals of red, blue, and green (RGB). Such identical blocks are continuously and repeatedly arranged to form an array like the one shown in FIG. 4A. Raw image data in this embodiment is data having each component expressed by 12 bits.

When the data of three components R, G, and B are to be generated (JPEG coding is to be performed) like one pixel of a normal color image, the respective R, G, and B data are calculated as follows.

Assume that a position (x, y) of interest coincides with the position of the primary color filter R, as shown in FIG. 4C. At the position (x, y), the data of the R component exists, but those of the B and G components do not exist. The R, G, and B data are therefore obtained in the following manner. Assume that in the following equations, D(x, y) represents the value of the coordinates (x, y) of raw image data.

$$R(x,y)=D(x,y)$$

$$G(x,y)=\{D(x+1,y)+D(x-1,y)+D(x,y+1)+D(x,y-1)\}/4$$

$$B(x,y)=\{D(x+1,y-1)+D(x-1,y+1)+D(x+1,y+1)+D(x-1,y-1)\}/4 \quad (1)$$

In the above case, the coordinate position of interest coincides with an R primary color filter. Even if, however, the pixel position of interest coincides with a G or B primary color filter, R, G, and B data are obtained in the same manner. Note, however, that if a G component is a component of interest, since there are only two sets of B and R data adjacent to the G component, the above equations are slightly changed.

A raw image data file of the image files recorded on the recording medium 111 is read out by a general-purpose information processing apparatus such as a personal computer (to be referred to as a PC hereinafter), and developing and editing processes are performed by application programs executed on the apparatus. This operation will be described below.

Figure 11:
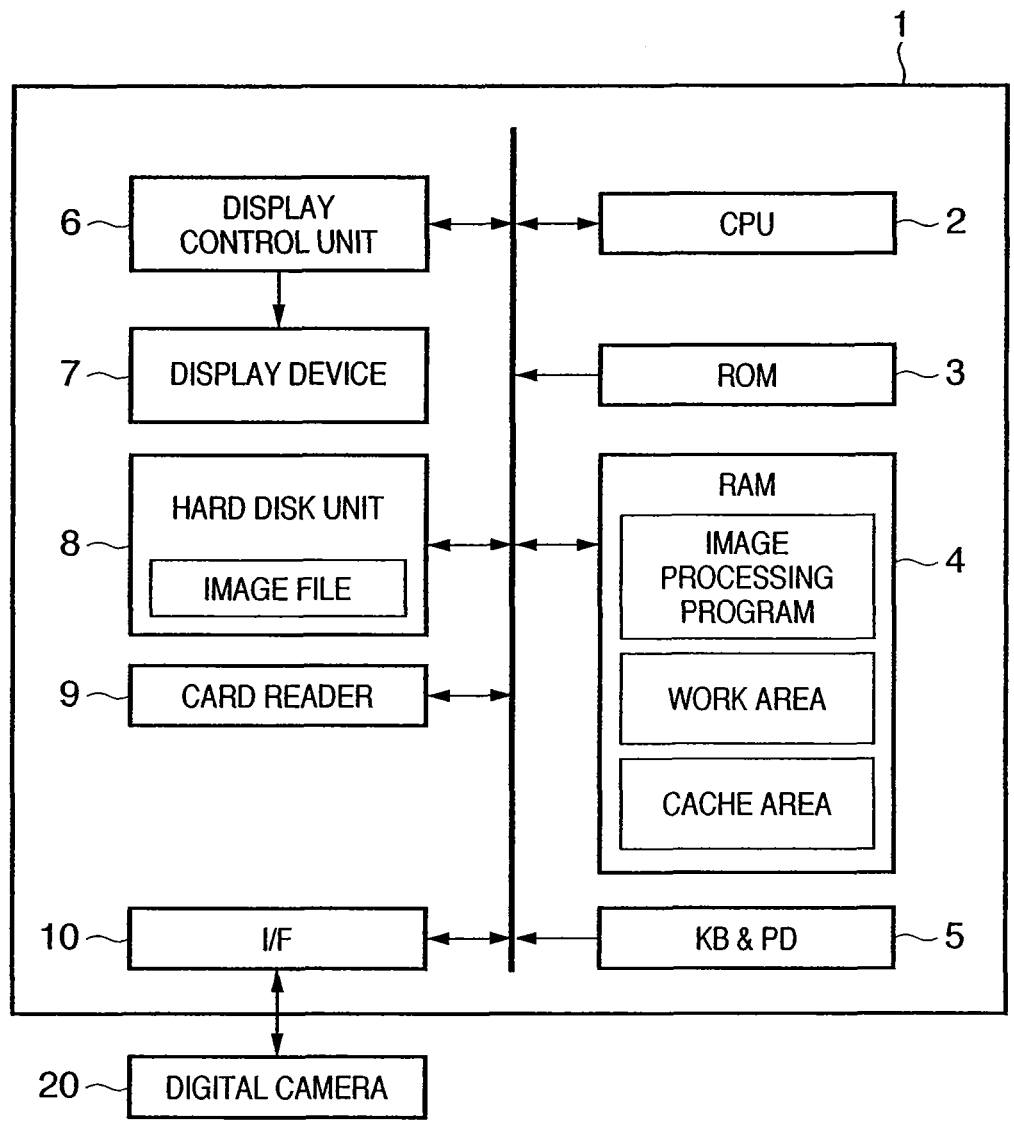
FIG. 11 is a block diagram showing the arrangement of an apparatus which performs image processing according to the embodiment.

FIG. 11 is a block diagram showing the arrangement of the PC in this embodiment. Referring to FIG. 11, reference numeral 1 denotes a PC body; 2, a CPU which controls the overall apparatus; 3, a ROM storing a BIOS and boot program; 4, a RAM; 5, a keyboard (KB) or a pointing device (PD) such as a mouse; 6, a display control unit incorporating a video memory; 7, a display device (e.g., a CRT or LCD display) which displays a video signal output from the display control unit; 9, a card reader which accesses a storage medium such as a memory card removed from the digital camera; and 10, an interface which connects to the interface 110 of a digital camera 20 (see FIG. 1).

In the above arrangement, when the power supply is turned on, the CPU 2 loads the OS from a hard disk unit 8 into the RAM 4 in accordance with the boot program in the ROM 3, and also loads an image editing application program according to this embodiment into the RAM 4 in accordance with an instruction from the user. As a consequence, this apparatus functions as an image processing apparatus. When the application in this embodiment starts, an image file is read and a work area in which various kinds of variable are to be ensured and a cache area are ensured, as shown in FIG. 11.

Figure 12:
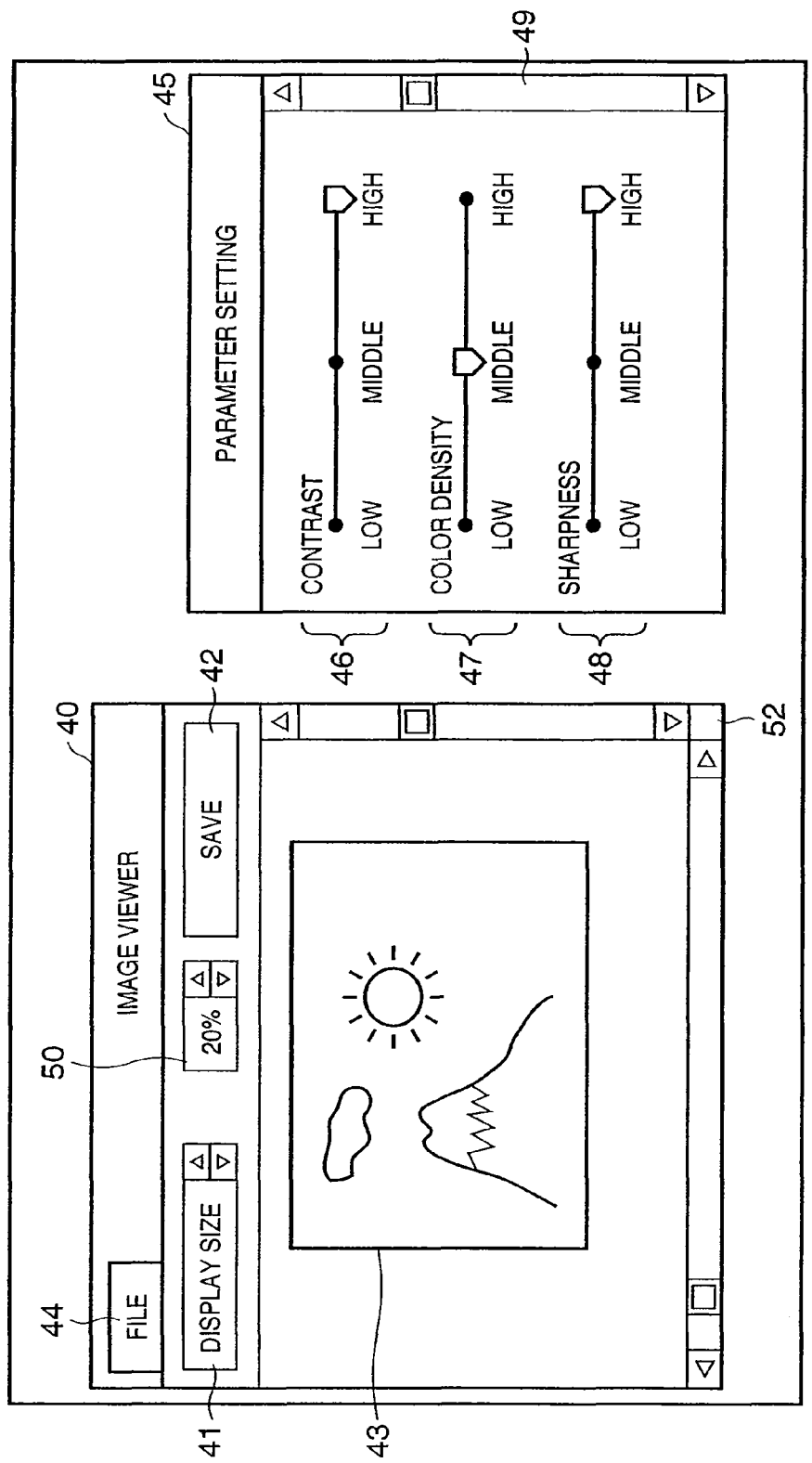
FIG. 12 is a view showing an example of a GUI window of an image processing application in the embodiment.

FIG. 12 shows a GUI for image editing which appears when the image editing application program in this embodiment is started. As shown in FIG. 12, when the editing program in this embodiment is executed, two windows 40 and 45 are displayed on the display screen.

The window 40 is used to mainly display an image in the process of being edited, and is provided with an image display area 43 which displays an image as a result of a developing process or editing, a display size instructing portion 41 which is used to designate the size of the image display area 43, a magnification instructing portion 50 which is used to designate a display magnification, a save button 42 which is operated to store an editing result, and a "file" button 44 which is operated to display a dialog box (not shown) for loading an image file. Upward and downward arrows are displayed on the right end of the display size instructing portion 41. The size of the image display area 43 can be changed by moving a cursor interlocked with a mouse to one of the arrows and performing clicking operation (to be simply referred to as operation hereinafter). The magnification instructing portion 50 is operated in the same manner. The size of the image display area 43 may be set to be larger than that of the window 40. The size of the window 40 itself can be changed by dragging a lower right portion 52 of the window 40.

Consider the magnification instructed by the magnification instructing portion 50. A magnification of 100% indicates that one pixel of an original image (raw image) corresponds to one pixel of the image display area 43. Therefore, "20%" in FIG. 12 indicates that 5×5 pixels of the original image correspond to one display pixel. That is, both the horizontal and vertical sizes are ⅕ those of the original image.

When a portion of an original image is displayed in the image display area 43, an image portion at a different position can be seen by scrolling the image within the image display area 43. An image in the image display area 43 is scrolled by moving the mouse cursor (not shown) into the image display area 43 and performing dragging operation (moving the mouse while pressing its button). However, vertical and horizontal scroll bars may be prepared additionally to realize this operation by operating them.

Consider the window 45 next. Various image editing items are displayed in this window. The user can adjust a desired editing item by moving the tab of a slider of the desired item (in FIG. 12, three levels, i.e., "low", "middle", and "high", are set, but as is obvious, more levels may be set). Referring to FIG. 12, as editing items, three items, i.e., a contrast control 46, color density control 47, and sharpness control 48, are displayed. However, by operating a scroll bar 49, other setting items (tone curve, brightness, white balance set value, color temperature, hue, and the like) can be displayed. In a state (default) immediately after the application in this embodiment is started, the tab positions of the slider bars of the respective editing items are determined by set information at the time of photography of the corresponding image. That is, when an image file is loaded, parameters are extracted from attribute information 301 of the image, and the tab position of the slider bars of the respective editing items are determined on the basis of the parameters. Note that if no corresponding set information exists in the attribute information 301, the tap position of the slider bar of the corresponding editing item is set to be located in the middle of the slider.

In the following description, the status value determined by the tab position of a slider bar of each editing item will be referred to as an editing parameter (or simply a parameter), and the operation of changing the state of a the editing item by changing its tab position will be referred to as "setting a parameter". Although the degree of editing for each item can be set with high operability by using a slider bar as shown in FIG. 12, such setting may be made by inputting a numerical value. Any display form can be used for this setting operation. Although the windows 40 and 45 are displayed, data may be displayed in one window.

The processing of displaying the image display area 43 in the execution of the application program according to the embodiment will be described below with reference to the flowchart of FIG. 5. Assume that the user has stored the image file obtained by image sensing by the digital camera in the hard disk unit 8 through the card reader 9 and interface 10.

As is known, the number of pixels obtained by the CCD 103 of the recent digital camera has increased, and has become much larger than the number of pixels that can be displayed on the display device 7 of the PC. Even as far as the OS for GUI is concerned, the size of a window that can be used by an application is inevitably smaller than the display area of the display device. It is therefore impossible to display an overall image on the display device at once while making one pixel of the sensed image data correspond to one pixel displayed on the display device (an enlargement ratio of 100%). For this reason, when a sensed image is to be displayed at an enlargement ratio of 100%, it cannot help but to display a portion of the sensed image in the image display area 43. In addition, in order to display an overall sensed image, there is no way but to make a plurality of pixels of the sensed image correspond to one display pixel by reducing the enlargement ratio to 20% (0.2 times) or decimate pixels at some proper intervals. The image editing application according to this embodiment is directed to perform an image editing process with focus being on such a point.

First of all, in step S501, a raw image file is loaded from, for example, the hard disk of a personal computer (or through the card reader 9 and interface 10) as an input means into the RAM 4.

In step S502, the attribute information 301 is loaded. This attribute information is imaging conditions determined when a raw image is sensed, and includes, for example, a bit depth (12 bits in this embodiment), compression format, exposure time, shutter speed, aperture value, luminance value, exposure correction value, lens minimum F value, object distance, photometric system, light source, flash on/off, lens focal length, F-number, exposure program, ISO speed rate, and flash intensity.

In step S503, the attribute information is analyzed to determine whether or not the image data is compressed. If the image data is compressed, the data is decompressed (decoded) on the basis of the compression format indicated by the attribute information in step S504. As a consequence, uncompressed raw image data can be obtained. Note, however, that at this point of time, each component is expressed by 12 bits.

In step S505, color interpolation processing is performed. The raw image is comprised of data in blocks each shown in FIG. 4B. For this reason, color interpolation processing is performed. This interpolation processing is, for example, linear interpolation, and hence R, G, and B data are generated by equations (1) given above.

In step S506, it is determined whether or not the user has set information for image quality adjustment on the personal computer (this set information will be referred to as user image quality adjustment information hereinafter). User image quality adjustment information includes, for example, sharpness, contrast, color matrix, tone curve, lightness, saturation, hue, and white balance, which are set with the keyboard or pointing device and temporarily stored in the RAM 4.

If user image quality adjustment information is set, the information is loaded from the RAM 4 in step S507.

In step S508, reproduction parameters for reproducing the raw image are generated from both the attribute information loaded in step S502 and the user image quality adjustment information loaded in step S507, and white balance processing is performed on the basis of the generated reproduction parameters. Attribute information necessary for white balance processing includes, for example, light source information, flash on/off, and flash intensity.

In step S509, R, G, and B primary color data (R, G, B) are converted into luminance and color difference data (Y, CbCr).

In step S510, luminance adjustment processing is performed on the basis of the attribute information loaded in step S502 described above and/or the user image quality adjustment information loaded in step S507. Attribute information necessary for luminance adjustment processing includes, for example, an exposure time, shutter speed, aperture value, luminance value, exposure correction value, object distance, photometric system, F-number, and exposure program.

In step S511, color adjustment processing is performed on the basis of the attribute information loaded in step S502 described above and/or the user image quality adjustment information loaded in step S507.

In step S512, sharpness adjustment processing is performed on the basis of the attribute information loaded in step S502 and/or the user image quality adjustment information loaded in step S507. Attribute information necessary for sharpness processing includes, for example, an exposure time, shutter speed, aperture value, luminance value, exposure correction value, object distance, photometric system, F-number, exposure program, lens distortion information, lens focal length, lens minimum F value, and ISO speed rate.

In step S513, luminance and color difference data (Y, Cb, Cr) are converted into primary color data (R, G, B), and each component is rounded to 8 bits to display the data. In other words, since the computation precision is 12 bits in steps S505 to S513, computation errors can be minimized.

In step S514, the resultant data is output to the display device 7. The display device 7 may be a CRT display, liquid crystal display, or the like.

The processing in steps S508 to S513 is performed on a pixel basis, the time required for this processing is proportional to the number of pixels. Note that in this embodiment, the processing from the white balance processing in step S508 to the conversion of the data into RGB data in step S513 after the color interpolation processing of the raw image in step S507 will be referred to as a developing process hereinafter.

This embodiment has exemplified the processing using the primary color filters and monochrome photosensitive layer. This processing, however, may vary depending on imaging sensor filter characteristics. For example, when a complementary color filter comprised of color signals of cyan, magenta, and yellow (CMY) is to be used or pixels of a plurality of colors are arrayed in different orders, the aspect ratio of the shape of a pixel is not 1:1 (e.g., 2:1). In each case, it suffices if processing after step S505 corresponds to the filter characteristics of each imaging sensor.

The correspondence relationship between the size of the image display area 43, the display magnification, and the original image size in the display device will be described next.

Figure 6A:
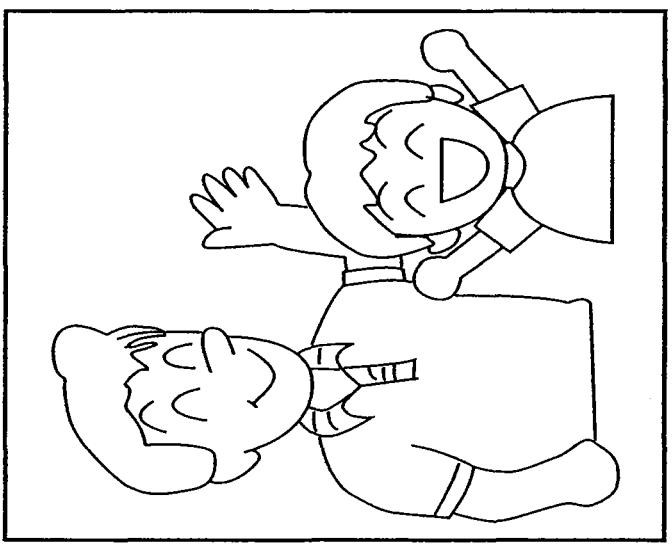
FIGS. 6A to 6C are views showing examples of the output results obtained at the respective display magnifications set in an image processing apparatus.
Figure 6B:
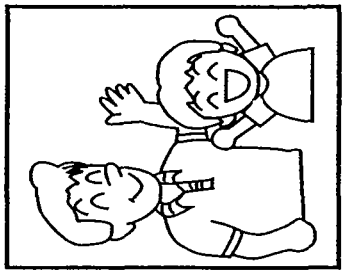
Figure 6C:
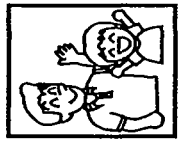

FIGS. 6A to 6C show examples of output results at different magnifications on the PC according to this embodiment.

Assuming that FIG. 6A shows the display output result of one-to-one display of an overall raw image, i.e., display at a magnification of 100%, FIGS. 6B and 6C respectively show the display output results at 50% and 25%. The number of pixels of the image displayed at a magnification of 50% in each of the vertical and horizontal directions is ½ that of the image displayed at a magnification of 100%. The total number of pixels (area) of the image displayed at a magnification of 50% in each of the vertical and horizontal directions is the square of ½, i.e., ¼ that of the image displayed at a magnification of 100%. The number of pixels of the image displayed at a magnification of 25% in each of the vertical and horizontal direction is ¼ that of the image displayed at a magnification of 100%. The total number of pixels (area) of the image displayed at 25% is the square of ¼, i.e., 1/16. That is, the number of pixels of an image displayed at a magnification of n % in each of the vertical and horizontal directions is n/100 that of the image displayed at a magnification of 100%, and the number of pixels (area) of the overall image is the square of n/100.

Decimation processing to be performed when the magnification of an overall raw image subjected to target image extraction processing is set to n % in this embodiment will be described below.

An image with a pixel count (x) in the horizontal direction and a pixel count (y) in the vertical direction is reduced to n/100 (n is a positive integer of 100 or less) by decimating the number of pixels in the horizontal direction by (x×(100−n)/100) and decimating the number of pixels in the vertical direction by (y×(100−n)/100). For example, decimation of pixels is performed by the following method. First of all, (n/100) is reduced to divisors expressed by (i/k). Then, i pixels are decimated at equal intervals from k pixels. If reduction of fraction cannot be performed or pixels cannot be decimated at equal intervals, it suffices to use a method which can reduce the number of pixels in the horizontal direction to (x×n/100) and the number of pixels in the vertical direction to (y×n/100) with a small amount of processing and most desirable image quality. In this manner, target image extraction processing is performed.

A more desirable reduction output result may be obtained by performing smoothing processing before, during, or after decimation processing. Smoothing processing is image processing of smoothing an image having undergone decimation of pixels to make it look more smoother. For example, output pixel information Out(x, y) in the image display area 43 is calculated from a coordinate position (x, y) of an original image and its neighboring pixels according to equation (2):

$$\text{Out}(x,y)=\{\text{In}(x,y)\times 2+\text{In}(x-1,y)+\text{In}(x+1, y)+\text{In}(x,y-1)+\text{In}(x,y+1)\}\div 6 \qquad (2)$$

FIGS. 7A to 7G show output results at the respective sizes of the image display area 43 which are set by the image processing apparatus according to this embodiment.

Figure 7A:
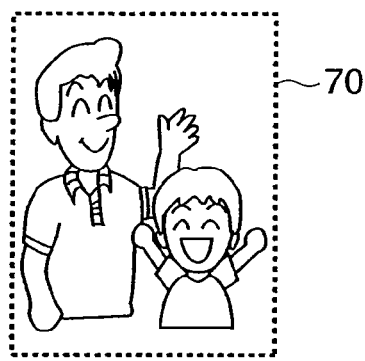
FIGS. 7A to 7G are views showing examples of the output results obtained at the respective display magnifications and the sizes of an image display area which are set in the image processing apparatus.
Figure 7C:
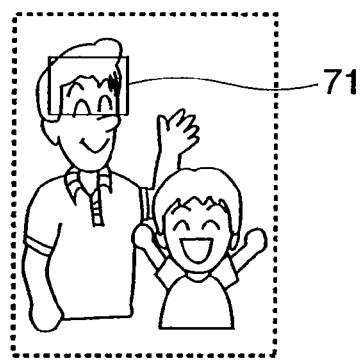

For example, the image surrounded by the dotted line indicates an overall original image. When the size of the image display area 43 is set to that shown in FIG. 7B and the magnification is set to 100%, the image within a frame 71 in FIG. 7C is displayed.

This will be described in more detail below. In the following description, the unit of coordinates is pixels.

Let (0, 0) be the coordinates of the upper left corner of an original image 70, and (1536, 2048) be the coordinates of the lower right corner. Assume that the size of the image display area 43 is set to that in Table 1. Consider a case wherein the coordinates (250, 300) in the original image are made to correspond to the upper left corner position in the image display area 43, and the resultant image is displayed at a magnification of 100%. In this case, a pixel position (x1, y1) in the original image which is to be displayed at the lower right corner in the image display area 43 is given by equations (3).

TABLE 1

| Magnification | 100% |
| --- | --- |
| Number of Pixels of Image Display Area in Horizontal Direction | 440 pixels |
| Number of Pixels of Image Display Area in Vertical Direction | 320 pixels |

$$x1=250+(440\times 100\div 100)-1$$

$$y1=300+(320\times 100\div 100)-1 \qquad (3)$$

Figure 7B:
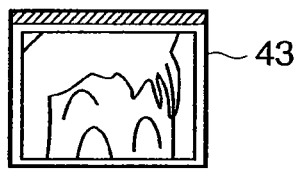
Figure 7E:
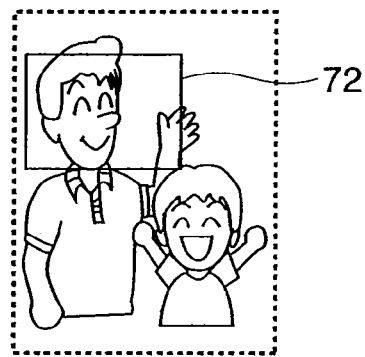
Figure 7D:
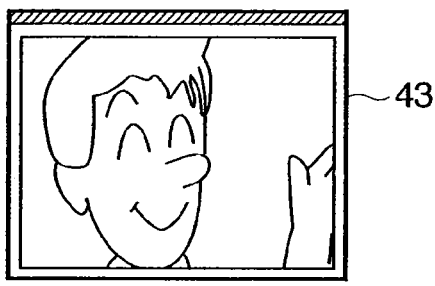

When the size of the image display area 43 is increased from the size in FIG. 7B to the size in FIG. 7D with the same magnification, image information in the solid line frame in FIG. 7E is displayed.

More specifically, when the size of the image display area 43 is set to the size in table 2, and a pixel of the original image at the coordinates (80, 120) is to be displayed at the upper left corner in the image display area 43, the coordinates of the original image to be displayed at the coordinates (x1, y1) on the lower right corner in the image display area are obtained by equations (4).

TABLE 2

| Magnification | 100% |
| --- | --- |
| Number of Pixels of Image Display Area in Horizontal Direction | 800 pixels |
| Number of Pixels of Image Display Area in Vertical Direction | 560 pixels |

$$x1=80+(800\times 100\div 100)-1$$

$$y1=120+(560\times 100\div 100)-1 \qquad (4)$$

Figure 7F:
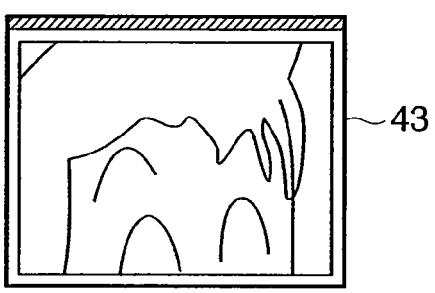
Figure 7G:
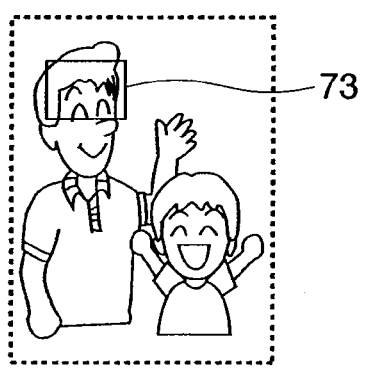

When the size of the image display area 43 is equal to that shown in FIG. 7D and the magnification is to be set to 200%, the image in a solid line frame 73 in FIG. 7G is displayed as shown in FIG. 7F.

More specifically, when a pixel of the original image at the coordinates (80, 120) is to be displayed at the upper left corner in the image display area 43, the coordinates of the original image to be displayed at the coordinates (x1, y1) on the lower right corner in the image display area are obtained by equations (5).

More specifically, when the size of the image display area 43 is set to the size in table 3, and a pixel of the original image at the coordinates (80, 120) is to be displayed at the upper left corner in the image display area 43, the coordinates of the original image to be displayed at the coordinates (x1, y1) on the lower right corner in the image display area are obtained by equations (5).

TABLE 3

| Magnification | 200% |
| --- | --- |
| Number of Pixels of Image Display Area in Horizontal Direction | 800 pixels |
| Number of Pixels of Image Display Area in Vertical Direction | 560 pixels |

$$x1 = 80 + (800 \times 100 \div 200) - 1$$

$$y1 = 120 + (560 \times 100 \div 200) - 1 \quad (5)$$

The above processing can be summarized as follows. Assume that the size of the image display area 43 is set to that shown in Table 4, the magnification (an integer indicated by a percentage) is M, and the coordinates of the original image to be displayed at the upper left corner in the image display area 43 are given by (x0, y0). In this case, coordinates (x1, y1) of a portion in the original image which is to be displayed at the lower right corner in the image display area 43 can be obtained by equations (6).

TABLE 4

| Magnification | M % |
| --- | --- |
| Number of Pixels of Image Display Area in Horizontal Direction | Window_W pixels |
| Number of Pixels of Image Display Area in Vertical Direction | Window_H pixels |

$$x1 = x0 + (Window\_W \times 100 \div M) - 1$$

$$y1 = y0 + (Window\_H \times 100 \div M) - 1 \quad (6)$$

As is obvious from the above description, an extraction range (the position and size of each of the frames 71 to 73) from the original image is determined from the size Window_W and height Window_H of the image display area 43, the corresponding magnification M, and the pixel position (x0, y0) of the original image to be displayed at the upper left corner position in the image display area 43.

Although, therefore, a developing process needs to be performed for an overall original image when the developing result is to be stored, a developing process during editing needs only to be performed for a partial area within an extraction range of the original image. This makes it possible to obtain a high response.

Figure 8:
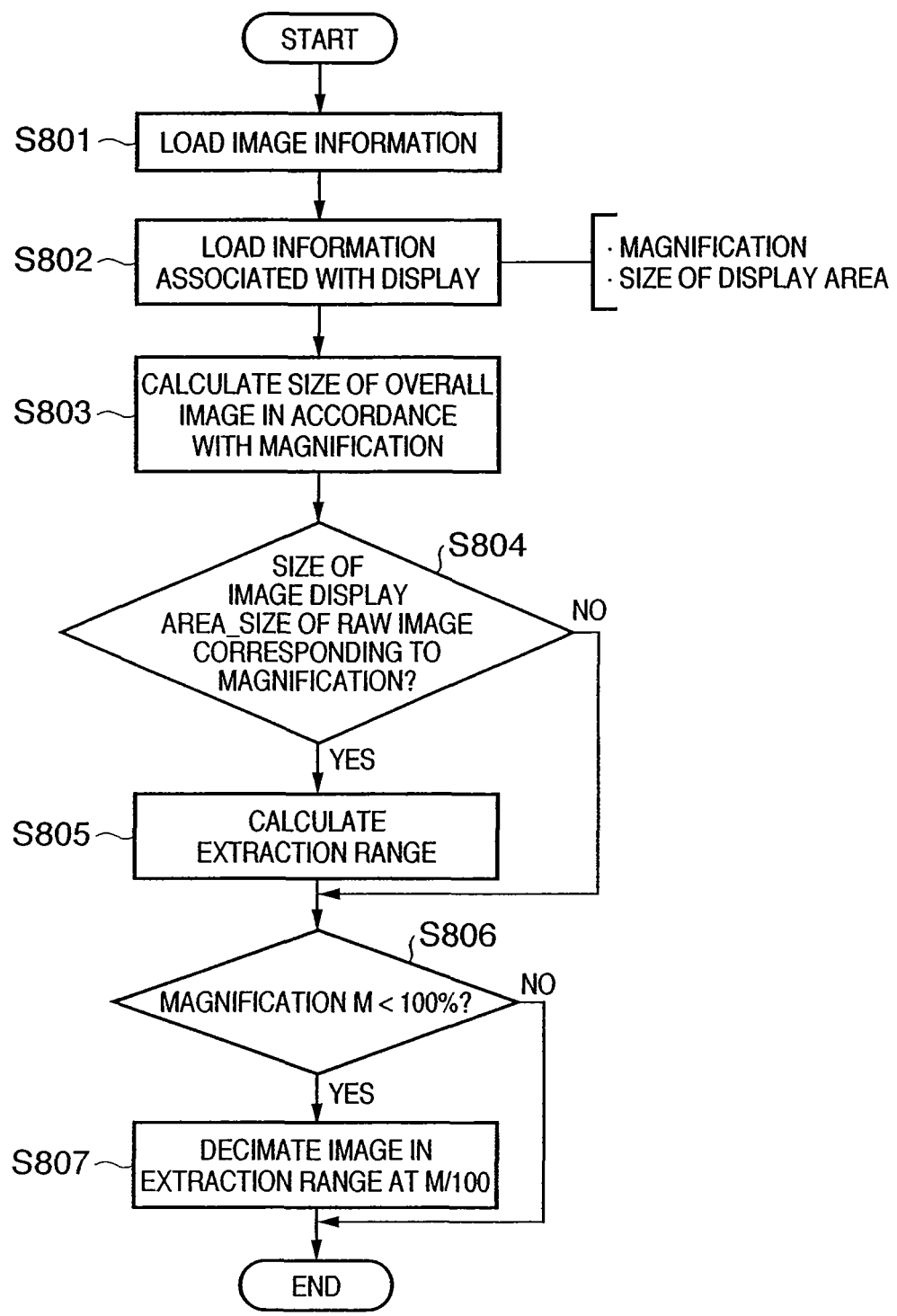
FIG. 8 is a flowchart showing the steps of the first means for changing image information to be processed in accordance with information associated with display in the image processing apparatus.

FIG. 8 is a flowchart showing image extraction processing (to be referred to as a target image extraction processing hereinafter) to be performed before a developing process. The processing in steps S801 to S807 will be referred to as target image extraction processing hereinafter.

This processing will be described with reference to the flowchart of FIG. 8. The respective variables in the description have the following meanings:

fulpix_w: the number of pixels of a raw image in the horizontal direction fulpix_h: the number of pixels of the raw image in the vertical direction window_w: the number of pixels of the image display area 43 in the horizontal direction window_h: the number of pixels of the image display area 43 in the vertical direction M: the magnification (%) designated by the magnification instructing portion 50

C_w: the number of pixels of the original image based on the magnification M in the horizontal direction C_h: the number of pixels of the original image based on the magnification M in the vertical direction In step S801, the image information of an overall image as a processing target is loaded from the raw image.

In step S802, information associated with display is loaded. The information associated with display includes the size information window_w and window_h of the image display area 43 displayed on the monitor and the magnification information M.

In step S803, the raw pixel sizes C_w and C_h based on the magnification are calculated according to equations (7):

$$C\_w = (fulpix\_w \times M \div 100)$$

$$C\_h = (fulpix\_h \times M \div 100) \quad (7)$$

In step S804, the size window_w/window_h of the image display area 43 is compared with the size C_w/C_h of the raw image in which the magnification M is reflected. More specifically, it is determined whether or not inequalities (8) and (9) are true:

$$window\_w < C\_w \quad (8)$$

$$window\_h < C\_h \quad (9)$$

If it is determined in step S804 that inequalities (8) and (9) are satisfied, it means that the overall raw image cannot be displayed. That is, a portion of the raw image is to be displayed. In step S805, therefore, the size and position of an extraction area for partial extraction of an image is calculated. The size of this extraction area may be obtained by equations (6) given above. Note that in equations (6), the coordinates (x0, y0) may be obtained in the following manner, when a developing process is performed for the raw image data for the first time, and the central position of the image display area 43 is made to coincide with the central portion of the raw image data:

$$x0 = fulpix\_w/2 - window\_w/2$$

$$y0 = fulpix\_h/2 - window\_h/2$$

If it is determined in step S804 that inequalities (8) and (9) are not satisfied, the size (width, height) of the overall image corresponding to the magnification M falls within the size of the image display area 43, and the overall raw image is displayed. The flow therefore advances to step S806.

In step S806, it is determined whether or not the magnification M is lower than 100% (the size of the original raw image), i.e., "M<100" is satisfied. If the magnification M is lower than 100%, since the overall image is reduced, the image data in the extraction area in the raw image data is decimated in accordance with "M/100", and the result is output as the processing result on "target image extraction processing" in this embodiment. This decimation processing is performed by the same method as that described with reference to FIGS. 6A to 6C. If the magnification M is equal to or more than 100% (one pixel of raw image=one display pixel), no decimation processing is performed, and the image data in the extraction area determined in step S805 is output as the result on "target image extraction processing".

In the above manner, image data is extracted from an extraction area in raw image data. For this extracted image data, the developing process in steps S508 to S513 in FIG. 5 is performed. Performing extraction processing in accordance with a display state in this manner can make an image as a target for a developing (reproduction) process become a portion of the raw image which is determined by the size of the image display area 43 and a set magnification. As a consequence, the number of pixels subjected to a developing process can be decreased, and hence the processing time required for the developing process can be shortened.

In addition, the raw image which has undergone color interpolation in step S505 may be held in a cache memory or the like. In this case, since the time required for color interpolation processing can be saved, the processing speed can be further increased.

Target image extraction processing in this embodiment can shorten the developing processing time as compared with a conventional developing process. This point will be described below. Prior to the description, variables are defined as follows:

bef_time: the processing time in the prior art (i.e., the processing time required to perform a developing process for overall image information)
aft_time: the processing time required when this embodiment is used
pre_time: the time require for the processing in steps S501 to S505, S506, and S507
dev_time: the time taken for a developing process per pixel
out_time: the time taken for the processing in step S514
ext_time: the time taken for target image extraction processing
outpix_w: the number of pixels of an image in the horizontal direction after target image extraction processing
outpix_h: the number of pixels of an image in the vertical direction after target image extraction processing
vis_width: the number of pixels in the horizontal direction in a display area which corresponds to a magnification
vis_height: the number of pixels in the vertical direction in a display area which corresponds to a magnification The processing (bef_time) in the prior art is given:

$$\text{bef\_time} = \text{pre\_time} + \text{dev\_time} \times (\text{fulpix\_}w \times \text{fulpix\_}h) + \text{out\_time} \quad (10)$$

In contrast to this, the processing time (aft_time) taken when target image extraction processing according to the present invention is performed is given by $$\text{aft\_time} = \text{pre\_time} + \text{ext\_time} + \text{dev\_time} \times (\text{outpix\_}w \times \text{outpix\_}h) + \text{out\_time} \quad (11)$$

Obviously, the values of fulpix_w, fulpix_h, outpix_x, and outpix_h are dominant for the times calculated by equations (10) and (11).

The following is a method of calculating the numbers of pixels (outpix_w, outpix_h) after target image extraction processing. Assume that the size (fulpix_w, fulpix_h) of the original image and information (M, window_w, window_h) associated with display have already been loaded (assigned).

```
C_h = fulpix_w*M/100;
C_w = fulpix_h*M/100;
if(C_W > window w){
    vis_width = window_w;
}else{
    vis_width = C_w;
}
if(C_h > window_h){
    vis_height = window_h;
}else{
    vis_height = C_h;
}
```

$$\text{outpix\_}w = \text{vis\_width} \times 100/M;$$

$$\text{outpix\_}h = \text{vis\_height} \times 100/M; \quad (12)$$

In this embodiment, equation (13) given below is always true.

$$\text{outpix\_}w \times \text{outpix\_}h \leq \text{fulpix\_}w \times \text{fulpix\_}h \quad (13)$$

If, therefore, inequality (14) is satisfied, inequality (15) is true.

$$\text{ext\_time} < \text{dev\_time} \times ((\text{fulpix\_}w \times \text{fulpix\_}h) - (\text{outpix\_}w \times \text{outpix\_}h)) \quad (14)$$

$$\text{bef\_time} > \text{aft\_time} \quad (15)$$

This embodiment has exemplified information recorded and attached to a file as attribute information. However, attribute information can be recorded on another file or stored in a different medium as long as it is associated with image information and recorded under a condition that allows the image processing apparatus to load it.

In this embodiment, when the user has performed only image quality adjustment without changing the image display area 43 and magnification M (i.e., has changed only user image quality adjustment information), the processing time can be further shortened by performing the processing in steps S508 to S514 for image information after the target pixel extraction, as long as the image information after the previous target pixel extraction processing is held in a storage medium such as a cache memory. Note, however, that this can be realized on the condition that the time required to load information from a storage medium (read_time) is shorter than the time until target image extraction processing (pre_time+ext_time). Equation (16) represents the processing time (cash_time) required when the processing in steps S508 to S514 is performed for image information after target image extraction processing.

$$\text{cash\_time} = \text{read\_time} + \text{dev\_time} \times (\text{outpix\_}w \times \text{outpix\_}h) + \text{out\_time} \quad (16)$$

If expression (17) holds, expression (18) is true.

$$\text{read\_time} < \text{pre\_time} + \text{ext\_time} + \text{dev\_time} \times ((\text{fulpix\_}w \times \text{fulpix\_}h) - (\text{outpix\_}w \times \text{outpix\_}h)) \quad (17)$$

$$\text{bef\_time} > \text{cash\_time} \quad (18)$$

In this embodiment, decimation processing (step S807) is performed after a range subjected to image reproduction and processing is calculated (step S805). However, the same effect as described above can be obtained even if the range is calculated after the decimation processing is performed.

If color interpolation processing, decimation processing, and extraction processing for a portion of the display area can be done simultaneously or concurrently, they may be done simultaneously or concurrently. Obviously, holding image information after color interpolation processing in a cache memory or the like will further speed up target image extraction processing, a developing process based on reproduction parameters set thereafter by the user, and display such as scrolling.

This embodiment has exemplified the case wherein target image extraction processing is performed for the image obtained by color interpolation processing for a raw image. Alternatively, if index information such as marking is inserted at intervals of a predetermined number of pixels at the time of recording a losslessly compressed raw image so as to allow recognition of a predetermined pixel position from the compressed raw image, target image extraction processing may be performed before the decompression processing in step S504. That is, after target image extraction processing is performed with respect to the raw image, decompression processing is performed for only the extracted range, and color interpolation and a subsequent developing process are performed. Performing decompression processing for only an extracted target image in this manner will eliminate the necessity to decompress the overall image in advance. This makes it possible to further shorten pre_time described above. In this case, although decompression processing and color interpolation processing after target image extraction are performed before a developing process, since the time required for this decompression processing is shorter than that required for the decompression of the overall image, the image after the developing process can be displayed at high speed.

In this embodiment, equations (6) represent the method of calculating a range as a target for image reproduction and a developing process. If neighboring pixels of an output pixel are required in a developing process as in the case of smoothing processing represented by equation (2), it suffices to perform a developing process for pixels in a range larger than the above range by the required numbers of pixels in the horizontal and vertical directions as target pixels and display only a corresponding range in the display area at the time of display.

In this embodiment, if the size of the image display area 43 is smaller than the size of a raw image and hence is not suitable for a check on image quality associated with resolution, e.g., is 100% or less, some proper processing in a developing process used in the case of 100% may be omitted to increase the processing speed as long as proper image quality as an index for image quality adjustment can be maintained. If, for example, the magnification is set to 25%, since the resultant image is difficult to use as a criterion for checking image quality associated with resolution, sharpness processing may be simplified. If only sharpness processing is to be performed, it suffices to only display an image extracted in accordance with the magnification without reflecting the processing result in the image. In this case, sharpness processing means aperture correction processing or edge enhancement processing.

As has been described in the first embodiment, a developing process result can be displayed at a higher speed than in the prior art by changing image information as a target for processing in accordance with, for example, an arbitrary magnification and the size of an image display area.

Figure 13:
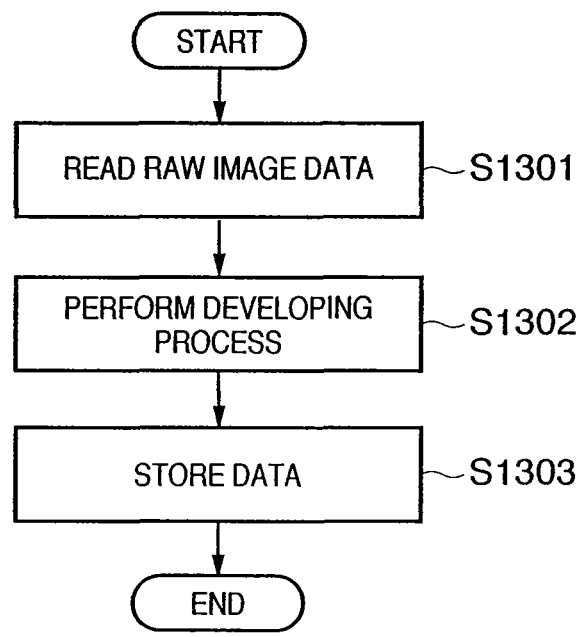
FIG. 13 is a flowchart showing the contents of processing to be done at the time of storage processing in the embodiment.

Note that the operator operates the save button 42 when he/she finally satisfies a developing process result in the above manner. When the save button 42 is operated, the editing result on the raw image data of interest is stored as a file according to the sequence shown in FIG. 13.

More specifically, in step S1301, raw image data is loaded. In step S1302, a developing process is performed for the input raw image in accordance with the parameters set on the window 45 immediately before the save button 42 is operated. This developing process may be performed on the assumption that the magnification is 100% and the size of the image display area 43 is equal to the size of the raw image. In step S1303, the processing result is stored as a file in the hard disk unit 8 or the like.

<Second Embodiment>

The first embodiment has exemplified how the display of an image after a developing process for real display is speeded up. It is preferable to perform the same image processing in the following cases: when image quality adjustment is performed (parameters for contrast, lightness, and the like are changed), when the size of an image display area 43 is changed, and when an image in the image display area is scrolled. If, however, a developing process is performed every time an image is scrolled by a slight distance while a final scroll position is not confirmed, for example, the image in the image display area 43 is scrolled, the scrolling operation becomes awkward. That is, in scroll processing, it is preferable to quickly respond to scrolling operation. This also applies to a case wherein the size of the image display area 43 is changed.

The second embodiment, therefore, will exemplify a case wherein while the size of the image display area 43 is changed or an image in the image display area 43 is scrolled, a simplified image is displayed until an image adjustment result is obtained and a final processing result is obtained. For the sake of simple explanation, it will described that a simplified image is displayed until an image adjustment result is obtained.

Figure 9:
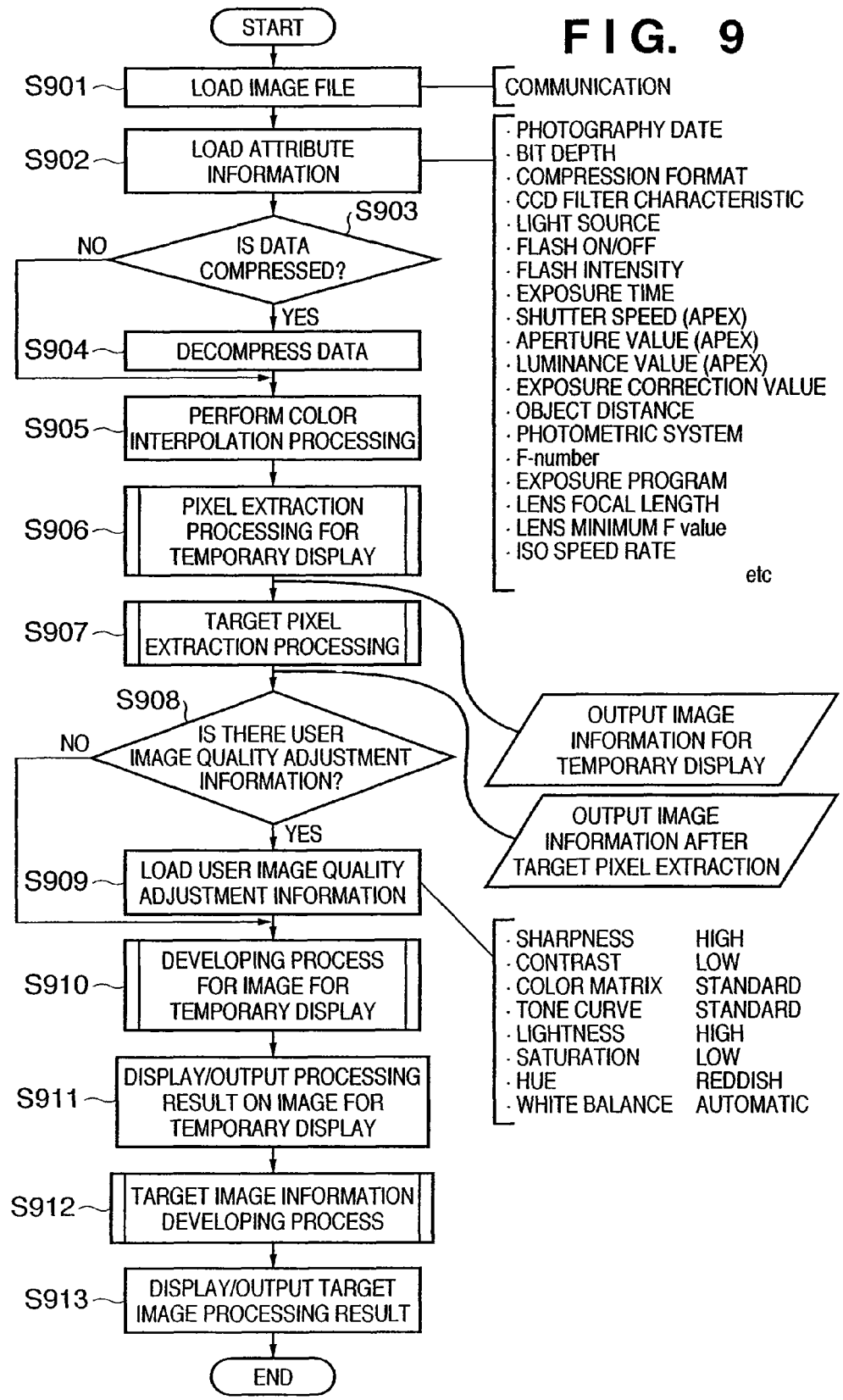
FIG. 9 is a flowchart showing the steps of the process of displaying a low-resolution image until an image processing result corresponding to information associated with display is output.

FIG. 9 is a flowchart showing a sequence of displaying a low-resolution image until an image processing result corresponding to information associated with display (an image quality adjustment parameter, the size of the image display area 43, and the magnification) is output.

The processing from step S901 to step S905 is the same as that from step S501 to step S505 in the first embodiment, and hence a description thereof will be omitted.

In step S906, low-resolution pixels for temporary display are extracted. The extraction method is the same as that used when decimation processing with a magnification of 100% or less is performed for an overall image.

The resolution (magnification) of image information for temporary display is set and registered in advance by an operator on the basis that proper image quality for temporary display is ensured and the operator can feel that the processing time is short.

The image information for temporary display can be used when image quality adjustment is performed or display information is changed as will be described later with reference to FIG. 10, and hence is held in a proper area in the RAM 4. However, this information may be stored in a hard disk unit 8.

In step S907, target pixel extraction processing is performed. The image information after this target pixel extraction processing is held in a cache area, as described in the first embodiment. If the image information after the target pixel extraction processing cannot be reused as in a case wherein information associated with display is changed, the image information is discarded.

The processing in steps S908 and 909 is the same as that in steps S506 and S507 in the first embodiment.

In step S910, a developing process is performed for the image information for temporary display. In step S911, the image processing result obtained in step S910 is output to the image display area 43 of a display device 7. This processing is the same as that in step S514. As a result, a simplified image is displayed in the image display area 43 until a true developing process is complete.

In step S912, a true developing process is performed for the image information after the target pixel extraction processing. In step S913, the image processing result obtained in step S912 is output to an output apparatus. This processing is also the same as that in step S514.

Figure 10:
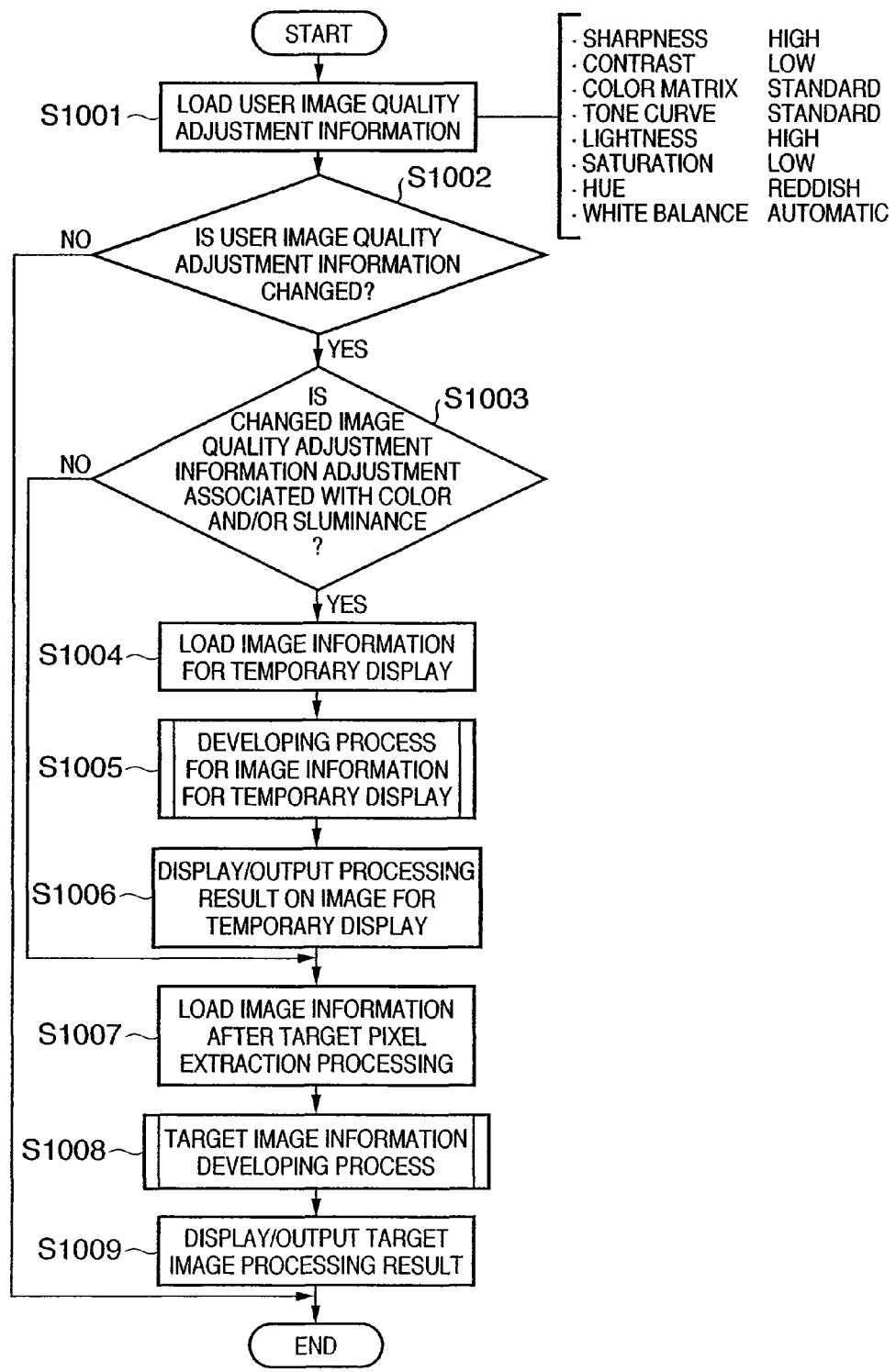
FIG. 10 is a flowchart showing the steps of the process of switching between displaying a processing result on low-resolution image information and not displaying it in accordance with changed image quality adjustment information.

FIG. 10 is a flowchart showing the processing to be executed when the user performs again image quality adjustment for the image having undergone the processing in FIG. 9.

First of all, in step S1001, user image quality adjustment information set by the operator through a window 45 is loaded. This processing is the same as that in step S507.

It is determined in step S1002 whether or not the user image quality adjustment information has been changed. If it is determined in step S1002 that the information has been changed, the processing from step S1003 to step S1008 is performed.

In step S1003, it is determined whether or not the changed user image quality adjustment information is a reproduction parameter for adjustment associated with color or brightness. The reproduction parameter for adjustment associated with color or brightness includes a parameter for contrast, color matrix, tone curve, lightness, saturation, hue, or white balance. If it is determined in step S1003 that adjustment information associated with color and/or luminance has been changed, the processing from step S1004 to step S1006 is performed.

In step S1004, the image information for temporary display stored in the RAM in advance in step S906 is loaded. If there is no image information for temporary display (the size and position of an image extraction area have been changed by scrolling or the like), the processing from step S901 to step S906 is performed again to generate image information.

In step S1005, a developing process is performed for low-resolution image information for temporary display. This processing is the same as that in step S910. In step S1006, the processing result on the image for temporary display which is obtained in step S1005 is output to the image display area 43 to be displayed (as in the processing in steps S514 and S911).

In step S1007, the image information after the target pixel extraction processing which is stored in, for example, the RAM is loaded. If there is no image information after target pixel extraction processing, the processing in steps S901 to S905 and S907 is performed again to generate image information.

In step S1008, a true developing process is performed for the image information after the target pixel extraction processing (as in the processing in step S912).

In step S1009, the image processing result obtained in step S1008 is output to the image display area 43 to be displayed (as in the processing in steps S514 and S913).

Some proper processing in a developing process associated with image information for temporary display in step S912 may be omitted as long as proper image quality for temporary display can be maintained. For example, sharpness processing, smoothing processing, noise reduction processing, and the like are difficult to use as targets for image quality checks with respect to a low-resolution image such as an image for temporary display, and hence may be omitted or simplified.

In this embodiment, when information associated with display is changed, for example, an image in the display area is scrolled or the size of the image display area 43 is changed, image information for temporary display within a range corresponding to the display area may be held in the cache memory, and the image for temporary display may be displayed until display switching is complete. In addition, if a reduced image for temporary display which has been processed on the basis of developing parameters set by the user in step S910 or S1005 is held in the cache memory, the reduced image can be displayed without the execution of the processing in step S1004 or S1005 until the raw image is processed. This makes it possible to reduce the time lag that occurs when the display image after a developing process is switched, thereby allowing smooth display update.

In this embodiment, image information for temporary display is extracted by decimating data from an overall image. However, such information may be extracted by decimating only data within a range corresponding to the display area as in target pixel extraction processing.

In this embodiment, it is determined in accordance with user image quality adjustment information whether or not a processing result on an image for temporary display is to be displayed. In addition to the above determination condition, however, if the number of pixels after target pixel extraction processing is smaller than the number of pixels for temporary display or there is hardly any difference between them, it may be determined that the processing result on the image for temporary display is not to be displayed. As for a criterion for determining that there is hardly any difference, whether or not a processing speed difference can be expected may be determined from the number of pixels or the loading speed of image information.

Assume that in this embodiment, during the processing in step S1008, operation is performed with respect to the window 45, the size of the image display area 43 is changed, or an image in the image display area is scrolled. In this case, if the processing in step S1008 is interrupted and the flow returns to step S1001 to redo the processing, an image for temporary display can always be updated during color adjustment and/or luminance adjustment. For example, there can be provided an image apparatus designed to update the display of an image for temporary display in real time during operation of a slider bar for the adjustment of contrast.

In this embodiment, the processing in steps S1004 and S1005 and the processing in steps S1007 and S1008 may be concurrently performed if the operating environment allows concurrent processing. In the above case, if the processing in steps S1005 to S1008 is terminated earlier, the processing in step S1009 may be performed without the execution of the processing in step S1006.

As described above, according to the second embodiment, there can be provided an image processing apparatus, in which when the size of the image display area 43 is changed, or while an image is scrolled, or when image quality adjustment is performed on the window 45, a simplified image for temporary display is displayed in the image display area 43 until final image processing is complete, thereby performing display update more smoothly than the first embodiment. In addition, there can be provided an image processing apparatus which can perform a detailed comparison by not performing temporary display when, for example, sharpness or smoothing processing is performed.

In this embodiment, data which is obtained by A/D-converting a signal output from the imaging sensor and has not undergone compression processing is used as raw image. However, data which has undergone lossless compression after A/D conversion may be used as raw image.

In addition, a raw image may be an output analog signal obtained from the imaging sensor, an image which has undergone A/D conversion but has not undergone at least white balance processing, an image signal which is obtained from the imaging sensor, has undergone A/D conversion, and has not undergone color separation processing of separating the signal into luminance and chrominance signals, or an output signal from a color filter such as a color filter having a Beyer array and has not undergone color interpolation processing.

In this embodiment, the CCD has been described as an imaging sensor. The same effects as described above can be obtained even if a CMOS sensor is used. When a sensor having multicolor photosensitive layers is used, the color data of each pixel is obtained instead of interpolation processing, but other operations are the same as those described above.

In the first and second embodiments, a developing process has been described as the processing of outputting image data to a monitor such as a CRT. However, this process includes the processing of printing and reproducing an image from a raw image on the basis of reproduction parameters.

In the embodiments, each component of raw image data is comprised of 12 bits. However, the present invention is not limited to this number of bits, and can be applied to any number of bits as long as it exceeds 8 bits as in JPEG Baseline coding.

In addition, the processing described in each embodiment can be implemented by application programs executed by a general-purpose information processing apparatus such as a personal computer which has hardware (e.g., a USB interface which a digital camera generally has or a device which accesses a storage medium such as a memory card removed from the digital camera) for inputting an image obtained by image sensing by an image sensing device such as a digital camera. Obviously, therefore, the present invention incorporates such computer programs. In general, the compute programs are stored in a computer-readable storage medium such as a CD-ROM, and are set in the computer to be copied or installed in the system, thereby allowing the programs to be executed. Obviously, therefore, the present invention incorporates such a computer-readable storage medium.

As has been described above, according to the present invention, raw image data sensed by a digital camera or the like can be processed with high response during a developing or editing process.

As many apparently widely different embodiments of the present invention can be made without departing from the spirit and scope thereof, it is to be understood that the invention is not limited to the specific embodiments thereof except as defined in the claims.

Claim of Priority

This application claims priority from Japanese Patent Application No. 2004-031401 filed on Feb. 6, 2004 and Japanese Patent Application No. 2005-000910 filed on Jan. 5, 2005, the entire contents of which are hereby incorporated by reference herein.

What is claimed is:

1. An image processing apparatus which develops RAW image data, the apparatus comprising:
 a magnification setting device that sets a magnification representing a ratio of a number of pixels within a display region of a display device to a number of pixels in a corresponding area in the RAW image data;
 a read out device that reads out RAW image data;
 a developing device that develops RAW image data;
 an extracting device that extracts, from the RAW image data, a number of pixels less than a number of all of pixels included in the RAW image data based on an area determined from the magnification set by said magnification setting device and the display region of the display device;
 a control device that causes said developing device to develop the pixels extracted by said extracting device;
 a display control device that controls the display device to display, within the display region, the image data developed by said developing device; and
 a parameter setting device that sets, in accordance with a user's operation, a parameter for a developing process,
 wherein said developing device executes the developing process in accordance with the parameter set by said parameter setting device,
 wherein the parameter to be set by said parameter setting device includes a parameter for sharpness processing, and
 wherein, when the magnification is less than 100%, said developing device executes a sharpness process simpler than a sharpness process for a magnification larger than 100% or does not execute the sharpness process.

2. The apparatus according to claim 1, further comprising a recording control device that (a) causes, in accordance with a user's operation, said developing device to develop all pixels included in the RAW image data, and (b) records image data obtained by the developing process onto a recording medium.

3. The apparatus according to claim 1, wherein, when said parameter setting device sets the parameter, said control device controls said developing device so as to develop pixels extracted by said extracting device in accordance with the parameter.

4. The apparatus according to claim 1, further comprising:
 a generating device that generates small RAW image data, for temporary display, having a small number of pixels by thinning out the RAW image data at a predetermined thinning ratio; and
 a holding device that holds the small RAW image data generated by said generating device,
 wherein, when the pixels extracted by said extracting device are developed by said developing device, said control device controls said developing device so as to execute a developing process on the small RAW image data held by said holding device as a preliminary image processing, and controls the display device so as to display, within the display region, an image obtained by the preliminary image processing until the developing process for the pixels extracted by said extracting device is completed.

5. The apparatus according to claim 4, wherein, in the preliminary image processing, said developing device executes the developing processing omitting at least one of a sharpness process, smoothing process, and noise reduction process.

6. The apparatus according to claim 4, wherein, when a specific parameter among parameters for developing is changed, said control device controls said developing device not to execute the preliminary image processing.

7. The apparatus according to claim 6, wherein the specific parameter excludes parameters for contrast, color matrix, tone curve, brightness, saturation, hue, and white balance.

8. The apparatus according to claim 4, wherein said generating device generates the small RAW image data from the whole of the RAW image data.

9. The apparatus according to claim 4, wherein said generating device generates the small RAW image data from pixels in an area, to be displayed within the display region, in the RAW image data.

10. A method of controlling an image processing apparatus which develops RAW image data, the method comprising the steps of:
 a magnification setting step of setting a magnification representing a ratio of a number of pixels within a display region of a display device to a number of pixels in a corresponding area in the RAW image data;

a read out step of reading out RAW image data;

a developing step of developing RAW image data;

an extracting step of extracting, from the RAW image data, a number of pixels less than a number of all of pixels included in the RAW image data based on an area determined from the magnification set by said magnification setting step and the display region of the display device;

a control step of causing said developing step to develop the pixels extracted in said extracting step;

a display control step of controlling the display device to display, within the display region, the image data developed in said developing step; and a parameter setting step of setting, in accordance with a user's operation, a parameter for a developing process, wherein said developing step executes the developing process in accordance with the parameter set by said parameter setting step;

wherein the parameter to be set by said parameter setting step includes a parameter for sharpness processing, and wherein, when the magnification is less than 100%, said developing step executes a sharpness process simpler than a sharpness process for a magnification larger than 100% or does not execute the sharpness process.

11. A non-transitory computer-readable storage medium storing a computer program to execute the method according to claim 10.

12. An image processing apparatus which develops RAW image data, the apparatus comprising:

a magnification setting device that sets a magnification representing a ratio of a number of pixels within a display region of a display device to a number of pixels in a corresponding area in the RAW image data;

a read out device that reads out RAW image data;

a developing device that develops RAW image data;

an extracting device that extracts, from the RAW image data, a number of pixels less than a number of all of pixels included in the RAW image data based on an area determined from the magnification set by said magnification setting device and the display region of the display device;

a control device that causes said developing device to develop the pixels extracted by said extracting device;

a display control device that controls the display device to display, within the display region, the image data developed by said developing device;

a generating device that generates small RAW image data, for temporary display, having a small number of pixels by thinning out the RAW image data at a predetermined thinning ratio; and a holding device that holds the small RAW image data generated by said generating device, wherein, when the pixels extracted by said extracting device are developed by said developing device, said control device controls said developing device so as to execute a developing process on the small RAW image data held by said holding device as a preliminary image processing, and controls the display device so as to display, within the display region, an image obtained by the preliminary image processing until the developing process for the pixels extracted by said extracting device is completed.

13. The apparatus according to claim 12, further comprising a recording control device that (a) causes, in accordance with a user's operation, said developing device to develop all pixels included in the RAW image data, and (b) records image data obtained by the developing process onto a recording medium.

14. The apparatus according to claim 12, further comprising a parameter setting device that sets, in accordance with a user's operation, a parameter for a developing process, wherein said developing device executes the developing process in accordance with the parameter set by said parameter setting device.

15. The apparatus according to claim 14, wherein, when said parameter setting device sets the parameter, said control device controls said developing device so as to develop pixels extracted by said extracting device in accordance with the parameter.

16. The apparatus according to claim 14, wherein the parameter to be set by said parameter setting device includes a parameter for sharpness processing, and wherein, when the magnification is less than 100%, said developing device executes a sharpness process simpler than a sharpness process for a magnification larger than 100% or does not execute the sharpness process.

17. The apparatus according to claim 12, wherein, in the preliminary image processing, said developing device executes the developing processing omitting at least one of a sharpness process, smoothing process, and noise reduction process.

18. The apparatus according to claim 12, wherein, when a specific parameter among parameters for developing is changed, said control device controls said developing device not to execute the preliminary image processing.

19. The apparatus according to claim 18, wherein the specific parameter excludes parameters for contrast, color matrix, tone curve, brightness, saturation, hue, and white balance.

20. The apparatus according to claim 12, wherein said generating device generates the small RAW image data from the whole of the RAW image data.

21. The apparatus according to claim 12, wherein said generating device generates the small RAW image data from pixels in an area, to be displayed within the display region, in the RAW image data.

22. A method of controlling an image processing apparatus which develops RAW image data, the method comprising the steps of:

a magnification setting step of setting a magnification representing a ratio of a number of pixels within a display region of a display device to a number of pixels in a corresponding area in the RAW image data;

a read out step of reading out RAW image data;

a developing step of developing RAW image data;

an extracting step of extracting, from the RAW image data, a number of pixels less than a number of all of pixels included in the RAW image data based on an area determined from the magnification set by said magnification setting step and the display region of the display device;

a control step of causing said developing step to develop the pixels extracted by said extracting step;

a display control step of controlling the display device to display, within the display region, the image data developed by said developing step;

a generating step of generating small RAW image data, for temporary display, having a small number of pixels by thinning out the RAW image data at a predetermined thinning ratio; and a holding step of holding the small RAW image data generated by said generating step, wherein, when the pixels extracted by said extracting step are developed by said developing step, said control step controls said developing step so as to execute a developing process on the small RAW image data held by said holding step as a preliminary image processing, and controls the display device so as to display, within the display region, an image obtained by the preliminary image processing until the developing process for the pixels extracted by said extracting step is completed.

23. A non-transitory computer-readable storage medium storing a computer program to execute the method according to claim 22.

* * * * *